May 15, 1962  H. McKEE GAMMON ET AL  3,034,201
METHOD OF MAKING PISTON PINS AND LIKE ARTICLES
Filed April 21, 1958  2 Sheets-Sheet 1
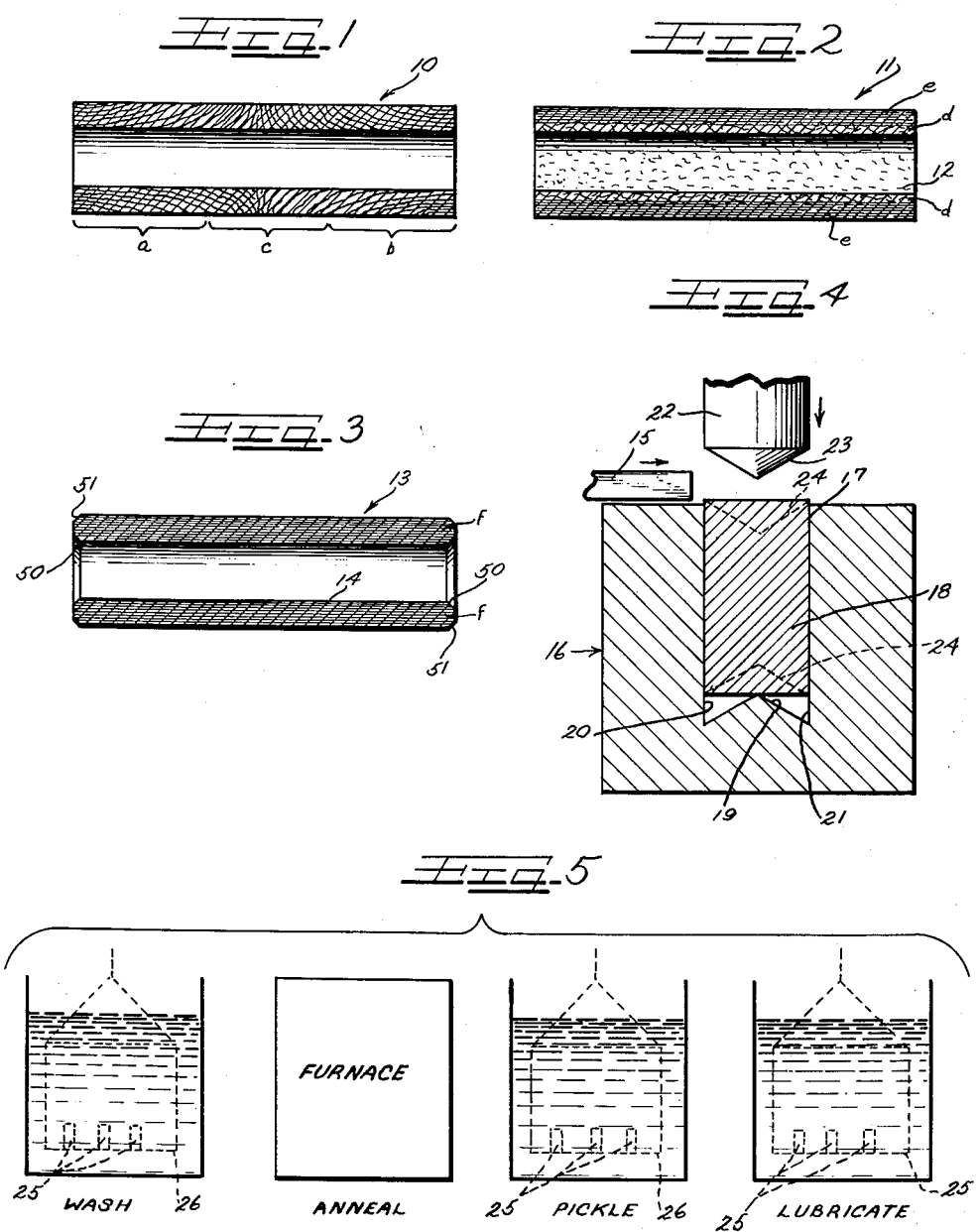
Inventors
Howard McKee Gammon
Joseph A. O'Neill

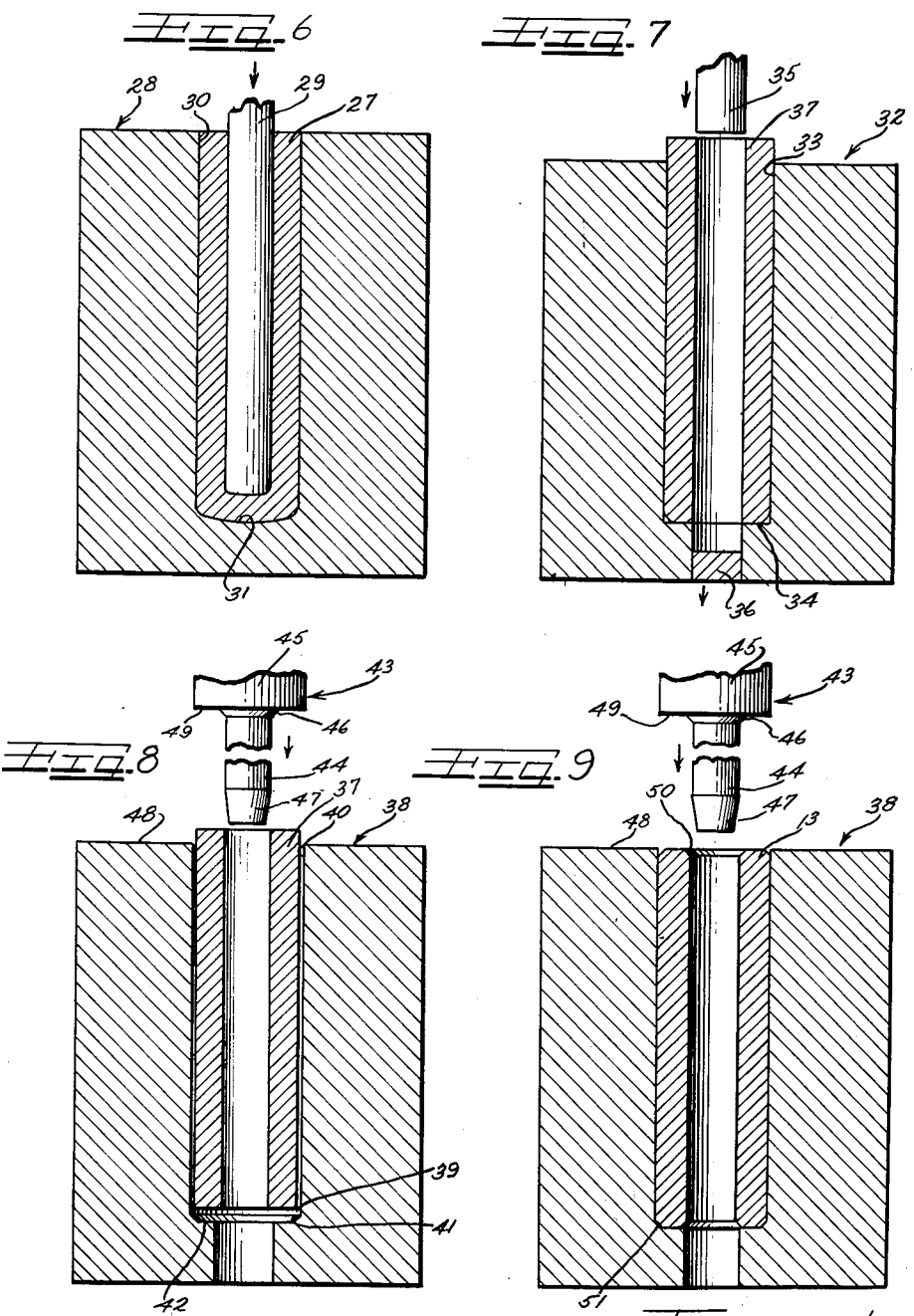

United States Patent Office 3,034,201
Patented May 15, 1962

3,034,201
METHOD OF MAKING PISTON PINS AND LIKE ARTICLES
Howard McKee Gammon, Idaho Falls, Idaho, and Joseph A. O'Neill, Parma, Ohio, assignors to Thompson Ramo Wooldridge Inc., a corporation of Ohio
Filed Apr. 21, 1958, Ser. No. 729,885
9 Claims. (Cl. 29—149.5)

The present invention relates broadly to metal forming, and is more particularly concerned with a new and improved method of making piston pins and like articles.

Essentially two methods have heretofore been employed in the formation of piston pins. In one technique, a substantially cylindrical solid slug is punched from opposite ends to produce a tube having a minor amount of residual metal generally midway of the length of the tube. Ultimately, the residual center portion is removed by a subsequent punching or piercing operation. An examination of the grain structure of a hollow tube or pin produced in this manner reveals lines of grain flow tapering radially outwardly in the region of the tube from which the residual metal was removed. The immediately apparent objection to this forming method is the structural weakness often found in the article produced.

Presumably in an endeavor to overcome the deficiency of the noted punching method, metal removal by drilling techniques is often utilized. While drilling a substantially cylindrical slug along its length does not produce a grain flow pattern in which the lines merge generally centrally of the slug or tube, a metallurgical examination reveals a random grain structure along the length of the article and radially outwardly into the wall thickness. In addition, the drilling procedure wastes substantial quantities of metal, and produces on the inner diameter of the piston pin a rough or torn surface which must be removed to effect compliance with certain customer specifications.

Quite in contrast, there is produced in accordance with the teachings of this invention a piston pin or similar article having a grain structure immediately distinguishable from the prior art, and in which the grain lines flow between opposite ends of the article in spaced and generally parallel relation. This is essentially accomplished in a novel manner by a limited number of steps in which a generally cylindrical slug, preferably having indented ends, is first formed or extruded into a hollow cylindrical shape having a rounded bottom, the bottom wall removed by a piercing or similar operation, and the tubular article finally shaped in a step which includes chamfering the inner and outer diameters thereof. Customary steps preparatory to extrusion, and including cleaning, etching, and lubricating, are employed as is the practice in the art.

It is accordingly a primary aim of the present invention to provide a forming method for tubular articles which is productive of improved grain flow patterns therein.

Another object of the invention lies in the provision of a novel method of producing a piston pin and the like to provide therein a grain flow pattern substantially continuous between opposite ends thereof.

Another object of this invention is to provide a method of manufacturing piston pins well adapted to production operations and by means of which substantial labor and material economies are readily effected.

Still another object of the invention is to provide a piston pin forming method wherein a substantially cylindrical slug is first formed into a generally cup-shaped cylinder, the closed end of said cylinder removed therefrom, and the tubular member shaped to final form and essentially simultaneously beveled corners produced at opposite ends thereof along the inner and outer diameters.

Other objects and advantages of the invention will become more apparent during the course of the following description, particularly when taken in connection with the accompanying drawings.

In the drawings, wherein like numerals are employed to designate like parts throughout the same:

FIGURE 1 is a sectional view through a prior art piston pin, showing the grain flow pattern generally obtained by customary punching techniques;

FIGURE 2 is a sectional view through another piston pin of the prior art, and showing the grain flow pattern normally resulting from the typical drilling technique;

FIGURE 3 is a sectional view of a piston pin of this invention, and showing the relatively smooth uninterrupted grain flow pattern which exists therethrough;

FIGURE 4 is a view of apparatus which may be employed to shear a slug from stock, and thereafter form indentations in the opposite ends thereof to facilitate subsequent processing;

FIGURE 5 is a view representing typical treatment steps preparatory to further formation of the slug;

FIGURE 6 is a view of a suitable die wherein the indented and treated slug from FIGURES 4 and 5 may be extruded into a generally cup-shaped cylinder;

FIGURE 7 is a view of a die wherein the cup-shape may be located and the bottom wall removed therefrom;

FIGURE 8 is a view of apparatus adapted to shape the tubular article from FIGURE 7 into final form, and produce beveled corners along the inner and outer diameters at opposite ends thereof; and FIGURE 9 is a view of the same apparatus as in FIGURE 8, and showing the piston pin after final forming therein.

Referring now to the drawings, there is illustrated in FIGURES 1 and 2 representative grain flow patterns generally appearing in prior art piston pins as produced by punching and drilling techniques, respectively. Piston pin 10 of FIGURE 1 is typical of the article obtained when a solid cylindrical plug is punched inwardly from opposite ends, and a tube formed having a solid center which is ultimately removed by a separate operation. Adjacent the end walls of the pin 10 the grain lines or bands flow generally parallel with the pin axis or circumference, as at $a$ and $b$, until generally the center section or approximately ⅓ of the length of the pin is approached. In this section, designated by the legend $c$, the grain flow lines or bands curve radially outwardly, and merge or even cross at times in the manner indicated. This is indicative of the stresses to which the center portion of the metallurgical structure is exposed as the body of the metal is moved centrally in a horizontal direction from opposite ends of the slug into a highly dense and compact mass in the center region of the tube. It is well known by those skilled in the art that a metal body possessing a grain structure of the character represented in FIGURE 1 possesses relatively poor strength characteristics, and that fractures originating in the center section $c$ of the pin 10 are to be anticipated when loads are placed thereon.

In an endeavor to produce satisfactory tubular articles of the piston pin type, drilling of a solid cylindrical slug is frequently employed as a substitute method for the punching technique just described. Representative of the results obtained is the section portrayed in FIGURE 2, and it may be seen therefrom that the grain structure and other physical characteristics of the pin still leave much room for improvement. A pin 11 drilled from one end to the other by customary techniques frequently produces burrs and the like 12 on the inner diameter, and this rough and torn surface must of course be removed by reaming or other procedures before a satisfactory article is obtained. In addition, it is quite apparent from FIGURE 2 that a substantial portion of the pin wall thickness possesses a random grain structure. This is represented by the legend d, and is believed to be the result of the radially outward compressive force exerted by the drill during its passage from one end to the other of the pin 11. This effect is not noticeable as the outer diameter of the pin is approached, and the grain flow pattern in this region e, is generally satisfactory. However, the presence of a random grain structure in a portion of the pin wall thickness represents a source of weakness, and a danger accordingly exists that break-down of the pin will ultimately result. And a companion disadvantage of the drilling method is of course the substantial amount of metal which is wasted.

The new and improved article provided by applicants is shown in FIGURE 3, and it may immediately be seen therefrom that the defects associated with prior art structures have been substantially entirely eliminated. Particularly, a pin 13 as formed in accordance with the teachings of this invention is provided with an inner diameter 14 free of burrs and the like, and a grain structure superior to that of the cylindrical drawn or rolled stock from which the pin 13 was formed. The grain structure of the novel piston pin is characterized by a plurality of concentric lines or bands f, generally evenly spaced and flowing from one end of the pin 13 to the other end thereof in a substantially straight line path essentially parallel to the inner and outer diameters of the pin. A grain structure of this character does not present in the pin 13 a source of physical weakness, and further, by practicing the method of this invention substantial quantities of metal are saved as contrasted with certain of the prior art forming techniques. In addition, since there is a complete absence of burrs thereon, no reaming step is required.

The first step in applicants' method is to sever a slug of predetermined length and diameter from coiled or rod stock. Piston pins are customarily fabricated from a carburized grade of plain or alloy steel, and among those suitable for the purpose are steels identified as SAE 1016, 1022, 5015 and 8620, the Rockwell "C" hardness of which range up to approximately 45.

Apparatus effective to shear a slug or blank from rod stock, and to initially form opposite ends thereof, is illustrated in FIGURE 4. There is provided for this purpose a shear member 15 preferably positioned adjacent a forming die 16 provided with a shaped cavity 17 receiving a slug 18 after severance from a length of rod stock by action of the shear member 15. The die 16 is provided primarily for the purpose of forming indentations in opposite ends of the slug 18, as indicated in phantom lines, to facilitate the subsequent processing of said slug. The cavity 17 of said die includes an upwardly tapering bottom surface 19 and generally parallel side walls 20 and 21 sized to accommodate without looseness the slug 18. One end of the slug 18 is indented or shaped by the bottom surface 19 of the die 16, and disposed thereabove to similarly indent the opposite end of said slug is a punch member 22 having a tapered shaping surface 23.

A cold header die is well adapted to perform the shearing and indenting operations, and each of these steps are accomplished with ease at room temperature. The provision of indented ends 24 on the slug after processing through the step of FIGURE 4 is for the purpose of convenient and expeditious location of the punch member during a subsequently performed extrusion step. Slippage of the punch from the slug is thereby avoided, however, indented ends 24 are not required in all instances, and accordingly, the first step may simply involve shearing from rod stock. The particular configuration of the indented ends 24 may additionally, of course, be varied; however, an included angle on said ends of between 150 and 160° has proven effective under most conditions encountered. Experience has further indicated that the surfaces forming the indented ends 24 should preferably possess a flat cone angle to the center of the slug.

To assure optimum results in performance of the extrusion step, it is accepted practice to suitably treat the slug prior to processing through an extrusion die. The essential steps in the treatment process are identified in FIGURE 5, and generally comprise washing, annealing, pickling and lubricating. Other steps may, of course, be interposed to obtain a particular result, and rinsing steps may, of course, be required in the cycle shown in FIGURE 5. A convenient manner of carrying the slugs 25 from FIGURE 4 through the steps of FIGURE 5 is in a basket or similar means 26 as shown.

The washing step is generally accomplished with hot water, and it may be necessary in certain instances that an alkali cleaning be used to remove grease and oil from the slugs. Should the alkali treatment be required, a rinse step would be called for prior to passage of the slugs into the furnace for the annealing step. The latter step performs the important function of preparing the metal for proper flow during extrusion in order to avoid tears in the metal, and preferably the annealing step is of the spheroidizing type. A cycle found suitable in practice is to heat the metal slug to the lower end of its critical range for between about 8 and 10 hours, followed by a normal cooling for between approximately 4 and 6 hours. For the purpose of removing scale and etching the surface of the slugs 25 prior to lubrication, a pickling step is preferably performed and this may be accomplished in a 10 to 12% sulphuric acid solution. A solution temperature of between 140 and 160° F. performs well, and according to the degree of etching desired, the immersion time is generally between 7 and 12 minutes.

Rinsing is then generally practiced, utilizing cold water and the overflow technique. The slugs are then next immersed in a suitable lubricant, and phosphoric acid is a customary chemical used for this purpose. Proprietary formulations are of course available, and the compound identified as "Bonderlube" of Parker Rustproof Company in Detroit has been found to impart the desired lubricating properties to the slug.

The next step in the present process is to extrude the lubricated slug into a generally cup-shaped cylindrical form 27, as shown in FIGURE 6, and this may be accomplished in a die 28 acting in combination with a punch member 29. The die 28 is provided with a straight wall 30, the inner diameter of which is greater than the outer diameter of the slug 25 to permit metal flow therein upon downward movement of the punch 29. The cavity 30 is shaped at its lower end with a generally concave bottom surface 31 against which the metal of the cold headed slug 25 is also forced during movement of the punch member 29 thereagainst. Room temperature conditions are adequate for the extrusion step, as well as the piercing and final forming steps now to be described.

A die and punch arrangement effective to pierce or cut the cup-shaped bottom from the cylindrical form produced by the step of FIGURE 6 is shown in FIGURE 7. A suitable construction comprises a die 32 having a stepped cavity 33 provided adjacent one end with a ledge surface 34 supporting the marginal end portions of the cup-shaped cylinder as extruded by the preceding step. After location of said cylinder in the die 32 in close contact with the inner diameter of the cavity 33, and against the ledge portion 34 of said cavity, a concave-end punch member 35 is directed into the cylinder and upon reaching the lower end thereof, piercingly engages and removes the bottom or end wall 36 in the manner of FIGURE 7. Punch 35 may have a square or even convex end.

The tubular shape 37 as formed in the piercing step described is thereupon chamfered, coined and finally shaped, and this may be done with apparatus of the character illustrated in FIGURES 8 and 9. Such apparatus preferably includes a die 38 having an open-ended cavity 39, shaped generally straight side walls 40 connecting with beveled corners or coining surfaces 41, and ledge portions 42 supporting the marginal end portions of the tubular member 37 during the coining, chamfering and final forming steps. A punch member 43 cooperates with the die disclosed and said punch is constructed with an elongated nose portion 44 and head portion 45 provided therebetween with an angled throat portion or chamfering surface 46. To facilitate entrance into the inner diameter of the tube 37, the punch nose portion may be tapered as at 47. Further, the diameter of the punch head portion 45 corresponds essentially to the diameter of the cavity 39.

While the tube 37 is shown in a slightly elevated position in FIGURE 8 in order to illustrate the coining surfaces 41 and ledge 42, it is to be noted that the depth of the cavity 39 between the ledge portion 42 and upper surface 48 of the die 38 is essentially the same as the overall length of the tube 37 as received from the piercing step of FIGURE 7. Further, the diameter of the cavity 39 conforms generally to the outer diameter of the shape from FIGURE 7. Accordingly, during the forming step illustrated in FIGURES 8 and 9, the tube is not markedly changed in length by the downward action of the punch 43; however, in the same operation the outer diameter of the tube is increased and the inner diameter decreased. The neck or nose portion 44 of the punch 43 is, to a minor degree, of lesser diameter than the inner diameter of the tube so that as said neck portion proceeds downwardly into the tube, the outer diameter of the tube is expanded outwardly to the extent permitted by the side walls 40 of the cavity 39 and the inner diameter decreased or contracted by radially inward metal flow to the punch 43. Stated otherwise, the neck portion 44 of the punch sizes the inner diameter of the tube, and in combination with the side walls 40 of the cavity 39, also size the outer diameter of said tube to accomplish concentricity.

It is to be emphasized that prior to the present invention a serious problem has been presented in endeavoring to maintain the proper concentricity between the inner and outer diameters of the piston pin. This problem is essentially entirely avoided by the novel techniques particularly shown in FIGURES 8 and 9, and whereby in addition to establishing concentricity between the noted pin diameters, a second beneficial result of restoring the inner diameter finish from the piercing step of FIGURE 7 is obtained, essentially simultaneously.

It should be additionally noted, with respect to the sizing of the pin inner and outer diameters, that when the tube 37 in FIGURE 8 is struck on one end by the punch member 43, the metal moves to completely fill the annular space between said punch and the die 38. This movement, although of a relatively minor degree, insures proper concentricity between the pin or tube inner and outer diameters, and at the same time, eliminates the rough surface finish on the inner diameter caused by the piercing step of FIGURE 7. Since the metal movement of FIGURES 8 and 9 is relatively small, the essentially parallel grain flow pattern is not materially disturbed.

Essentially simultaneously with shaping of the open-ended cylinder 37 to the final form desired, a chamfer or radius corner is placed at opposite ends of the tube on both the inner and outer diameters thereof. A chamfer on the inner diameter is produced by the throat or angled surface 46 of the punch 43 when said punch reaches essentially the end of its stroke, and the chamfer on the outer diameter is provided by moving said diameter against the sloping or coining surface 41 of the die cavity 39 by action of the relatively flat bottom surface 49 of the punch head portion 45 contacting the upper surface 48 or the die 38. Thus, a single stroke of the punch 43 finally shapes the tube and forms a chamfer on the inner diameter of the tube at one end and a coined surface on the outer diameter at the opposite end. The tube is then removed from the die and located therein in an inverted position, and a chamfer provided on the inner diameter adjacent the outer diameter chamfer previously provided and the outer diameter of the tube at the opposite end chamfered or coined. The tube or piston pin 13 as finally produced is shown in FIGURE 9, as well as FIGURE 3, and the chamfered inner diameter indicated at 50 and the coined outer diameter at 51 at opposite ends of the pin 13.

It may be seen from the foregoing that applicants have provided a novel method of forming piston pins and similar articles requiring only a minimum number of steps to produce an article having characteristics far superior to those found in the prior art. By use of the die constructions and shaping steps disclosed, the metal is moved in a manner productive of improvements in grain structure from that existing in the rod stock from which the pin is formed. There exists in the novel article produced by applicants a grain structure having no potential weakness areas therein, and the inner diameter requires no processing step to remove burrs or the like therefrom. The method is characterized by metal movement rather than metal removal, and in addition to the important advantage of a superior grain structure obtained, a great quantity of metal is saved when contrasted with the drilling and other methods hereinbefore described.

It is to be understood that modifications and variations may be effected in the process steps without departing from the spirit of the invention or the scope of the subjoined claims.

We claim as our invention:

1. A method of producing piston pins and the like, which comprises extruding a solid slug into a hollow cylinder closed at one end, removing from said cylinder the closed end thereof to provide a tubular shape, and finally forming said shape by decreasing the inner diameter and increasing the outer diameter to make said diameters essentially concentric while maintaining the axial length of the shape essentially constant.

2. A method of producing piston pins and the like, which comprises forming a solid generally cylindrical slug into a hollow cylinder provided with an end wall, supporting said cylinder along the marginal end portions and piercing the end wall therefrom to produce a tubular shape, supporting the shape on end and coining said end while substantially simultaneously chamfering the opposite end of said shape along the inner diameter thereof, supporting the shape on its chamfered end and coining said end while essentially simultaneously chamfering the other end along the inner diameter thereof, and during said coining and chamfering steps forming the shape and establishing concentricity between the inner and outer diameters thereof.

3. A method of producing piston pins and the like, which comprises supporting a solid slug on end in a die having a generally concave bottom, directing a punch member provided with a generally convex shaping surface against the opposite end of said slug and extruding said slug into a hollow cylindrical shape having an end wall conforming in curvature to the punch shaping surface and die bottom, supporting the cylindrical shape in an open-ended die and piercing the end wall from said cylinder to form a tubular shape, supporting the shape on end in a die cavity having a coining surface therein and directing a punch member into the shape and substantially simultaneously decreasing the inner diameter and increasing the outer diameter of the shape to the final form desired.

4. A method of producing piston pins and the like, which comprises forming indentations in opposite ends of a solid slug, supporting the slug on one indented end in a die having a generally concave bottom, directing a punch member provided with a generally convex shaping surface against the opposite indented end of said slug and extruding said slug into a hollow cylinder having an end wall conforming in curvature to the punch shaping surface and die bottom, supporting the cylinder in an open ended die and piercing the end wall from said cylinder to form a tubular shape, supporting the shape on end in a die cavity having a coining surface therein, directing a punch member provided with a chamfering surface thereon into the shape and substantially simultaneously forming at the supported end of said shape a coined outer diameter and at the opposite end a chamfered inner diameter, removing the shape from the die and supporting it therein upon its coined end, again directing the punch member into the shape and substantially simultaneously forming a chamfered inner diameter at one end and a coined outer diameter at the opposite supported end and forming the inner and outer diameters of the shape while located in the die to establish concentricity of said diameters.

5. A method of producing piston pins and the like, which comprises severing from rod stock slugs of predetermined length, supporting one of said slugs on end in a die having an upwardly tapering bottom, directing a punch member provided with a downwardly tapering shaping surface against the opposite end of the slug and forming indentations in opposite ends thereof conforming to the die bottom and punch shaping surface, supporting the slug on one indented end in a die having a generally concave bottom, directing a punch member provided with a generally convex shaping surface against the opposite indented end of said slug and extruding said slug into a hollow cylinder shape having an end wall conforming in curvature to the punch shaping surface and die bottom, supporting the cylinder in an open ended die and piercing the end wall from said cylinder to form a tubular shape, supporting the shape on end in a die cavity having a coining surface therein, directing a punch member provided with a chamfering surface thereon into the shape and simultaneously forming at the supported end of said shape a coined outer diameter and at the opposite end a chamfered inner diameter, removing the shape from the die and supporting it therein upon its coined end, and again directing the punch member into the shape and substantially simultaneously forming a chamfered inner diameter at one end and a coined outer diameter at the opposite supporting end.

6. A method of producing piston pins and the like, which comprises extruding a solid slug into a hollow shape, locating said shape in a die having a cavity not substantially greater than the outer diameter of the shape, and directing into the hollow shape while located in the die a punch member provided with a diameter not substantially greater than the inner diameter of the shape to finally size said inner and outer diameters and make said diameters concentric throughout the length of the shape while maintaining the axial length and wall thickness essentially constant.

7. A method of producing piston pins and the like, which comprises extruding a solid slug into a hollow cylinder closed at one end, piercing from said cylinder the closed end thereof to provide a tubular shape, sizing the inner and outer diameters of the shape to establish concentricity therebetween throughout the length of the shape and coining the shape first at one end and then at the other end while substantially simultaneously chamfering the inner diameter at opposite ends thereof while maintaining the axial length and wall thickness of the shape essentially constant, said first coining at one end and chamfering at the opposite end being performed essentially simultaneously with the sizing step.

8. A method of producing piston pins and the like, which comprises supporting a tubular shape on end and coining said end while substantially simultaneously chamfering the opposite end of said shape along the inner diameter thereof, supporting the shape on its chamfered end and coining said end while essentially simultaneously chamfering the other end along the inner diameter thereof, and during said coining and chamfering steps forming the shape and establishing concentricity between the inner and outer diameter thereof while maintaining the axial length of the shape substantially constant.

9. A method of producing piston pins and the like, which comprises forming a solid generally cylindrical slug into a hollow cylinder provided with an end wall, supporting said cylinder and piercing the end wall therefrom to produce a tubular shape, supporting the shape and coining one end thereof while substantially simultaneously chamfering the opposite end of said shape along the inner diameter thereof, supporting the shape and coining the chamfered end thereof while essentially simultaneously chamfering the other end along the inner diameter thereof, and during said coining and chamfering steps forming the shape and establishing concentricity between the inner and outer diameters thereof while maintaining the axial length of the shape substantially constant.

References Cited in the file of this patent

UNITED STATES PATENTS

| | | |
|---|---|---|
| 652,845 | Halifax | May 3, 1900 |
| 1,224,805 | Stevenson | May 1, 1917 |
| 1,314,037 | Amberg | Aug. 26, 1919 |
| 1,325,073 | Boyd | Dec. 16, 1919 |
| 1,929,802 | Brauchler | Oct. 10, 1933 |
| 1,949,527 | Briney | Mar. 6, 1934 |
| 1,978,372 | Purtell | Oct. 23, 1934 |
| 2,251,094 | Witter | July 29, 1941 |
| 2,267,229 | Zimmerman | Dec. 23, 1941 |
| 2,344,803 | Criley | Mar. 21, 1944 |
| 2,806,752 | Ginn | Sept. 17, 1957 |
| 2,849,265 | Teneyck | Aug. 26, 1958 |